United States Patent
Penke et al.

(10) Patent No.: US 7,492,472 B2
(45) Date of Patent: Feb. 17, 2009

(54) MULTIMEDIA COMMUNICATIONS/COLLABORATION HUB

(75) Inventors: Mark S. Penke, West Henrietta, NY (US); Donald A. Brown, Honeoye Falls, NY (US)

(73) Assignee: Xerox Corporation, Norwalk, CT (US)

( * ) Notice: Subject to any disclaimer, the term of this patent is extended or adjusted under 35 U.S.C. 154(b) by 1207 days.

(21) Appl. No.: 10/697,368

(22) Filed: Oct. 30, 2003

(65) Prior Publication Data

US 2005/0097608 A1 May 5, 2005

(51) Int. Cl.
G06F 3/12 (2006.01)

(52) U.S. Cl. ............. 358/1.15; 358/403; 358/400; 379/220

(58) Field of Classification Search ............. 358/419, 358/403, 435, 1.15, 444, 479; 726/1–36; 379/220, 145, 401
See application file for complete search history.

(56) References Cited

U.S. PATENT DOCUMENTS

| | | | |
|---|---|---|---|
| 4,779,105 A | 10/1988 | Thomson et al. | |
| 5,119,079 A | 6/1992 | Hube et al. | |
| 5,308,058 A | 5/1994 | Mandel et al. | |
| 5,657,461 A | 8/1997 | Harkins et al. | |
| 5,815,764 A | 9/1998 | Tomory | |
| 5,978,559 A | 11/1999 | Quinion | |
| 5,987,535 A | 11/1999 | Knodt et al. | |
| 6,213,652 B1 | 4/2001 | Suzuki et al. | |
| 6,470,155 B1 | 10/2002 | Martin et al. | |
| 6,601,040 B1* | 7/2003 | Kolls | 705/14 |
| 6,606,163 B1 | 8/2003 | Suzuki et al. | |
| 7,149,296 B2* | 12/2006 | Brown et al. | 379/145 |
| 2001/0017708 A1* | 8/2001 | Kobayashi et al. | 358/1.13 |
| 2002/0055835 A1* | 5/2002 | Carcoba Olivares et al. | 704/9 |
| 2002/0077889 A1* | 6/2002 | Kolls | 705/14 |
| 2002/0095587 A1* | 7/2002 | Doyle et al. | 713/186 |
| 2002/0120370 A1* | 8/2002 | Parupudi et al. | 701/1 |
| 2002/0151992 A1* | 10/2002 | Hoffberg et al. | 700/83 |
| 2002/0156704 A1* | 10/2002 | Kolls | 705/27 |
| 2003/0159044 A1* | 8/2003 | Doyle et al. | 713/176 |
| 2003/0172001 A1* | 9/2003 | Yasuda et al. | 705/26 |
| 2003/0231785 A1* | 12/2003 | Rhoads et al. | 382/100 |

* cited by examiner

Primary Examiner—Negussie Worku
(74) Attorney, Agent, or Firm—Fay Sharpe LLP

(57) ABSTRACT

A hub allowing collaboration and communication, including delayed and secure printing, faxing, telephone service, internet and e-mail access, and data transfer between personal electronic devices and the hub and/or other personal electronic devices and/or remote devices. Embodiments operate on a fee-for-service basis and can include a payment acceptance module. Embodiments include a large main display on which advertisements and information can be displayed during periods of non-use. Additional displays can be included with associated input devices to allow multiple users to use the hub simultaneously. Embodiments can include networking ports, wired and/or wireless, with which users can connect devices to the hub for data transfer, sharing, and collaboration.

90 Claims, 7 Drawing Sheets

MULTIMEDIA COMMUNICATIONS/COLLABORATION HUB

CROSS-REFERENCE TO RELATED APPLICATIONS

This application is related to U.S. Design patent application Ser. No. 10/697,368. This application is also related to U.S. patent application Ser. No. 10/696,903 filed concurrently herewith.

BACKGROUND AND SUMMARY

With the ubiquity of portable electronic devices, personal digital assistants, cellular telephones, and portable computers, as well as increasing dependency on e-mail and other aspects of the internet, situations often arise in which a person will need to check e-mail, gain internet/web access, print documents, or have a video conference. While cell phones can provide basic web and e-mail access in some situations, often fees associated with such access are excessive, speed of connections are slow, and/or the user will need to view content or an attachment that the cell phone can not display.

Portable computers enable people to work on the go, and more public places offer fee-for-service Internet access. However, these typically do not offer printing and other services that users may need. To partly provide such services, many airports offer internet booth rentals in which computers with printers can be used for internet access and work, perhaps also allowing the use of a traveler's own portable computer.

Embodiments contemplate a public access multimedia communications and collaboration hub that allows travelers and other users to browse the internet, check e-mail and webmail, and connect portable devices for file transfers, printing, and other functions and services on a fee-for-service basis. Additionally, embodiments include videoconferencing capabilities and fax transmission capabilities. Preferably, embodiments also allow users to employ the camera and microphone(s) of the hub to capture movies and/or still images that can be stored and/or transmitted.

Preferably, embodiments offer services including, for example, telephone service, document or data creation, CD/DVD burning of data, video, and audio. Further, embodiments can provide directions, offer video games, sell software by downloading and storing on media or transferring directly to the user's computer. For embodiments in public spaces, displays not in use could display advertising, which could be a source of revenue. For example, ads could promote upcoming movies, products, services, and companies as do conventional billboards and other advertising media. Additionally, the ads could include video, audio, static images, and computer animations as desired by advertisers.

Embodiments are preferably controlled by a number of input devices, such as touch sensitive devices, mice, keyboards, tracked laser spots or tracked objects, and tags. Examples of touch sensitive devices include touch screens and trackpads. Preferably, embodiments include authentication systems, such as use of personal codes or passwords that can be transmitted from a user's personal electronic device or entered via an input device. Embodiments preferably sense an approaching user, as with motion sensors or pressure sensors embedded in surrounding floor material, and send inquiries via wireless communications protocols to determine whether the user is carrying an electronic device that can provide identification and/or password, as by virtual business card or the like. Additionally, embodiments can employ voice authentication, allowing a user to speak his/her name and/or a password.

To enable remote printing for users, embodiments provide lockable printing in various forms. For example, jobs for which a user is likely to wait can be held on a storage medium or in memory until the user arrives and provides a code. For jobs for which a user is less likely to wait, secure output areas can be provided that remain locked closed until the user arrives, at which point the UI of the hub directs the user to the appropriate output area on confirmation of ID and/or password.

Embodiments further contemplate automated supplies and service monitoring and upkeep using, for example, Xerox® Device Centric Services™ (DCS). DCS provides provisioning, diagnostic, and other services that can be stored locally or acquired from a remote services host. If a service is not on a particular installation, DCS can acquire the service at a user's direction.

Embodiments can be employed, for example, in common areas of public spaces, such as transportation terminals. Users can order embodiments through, for example, the Xerox service network via a personal electronic device, such as a wireless PDA, or the like, printing, collation, and stapling of presentation materials from a public access hub according to embodiments. The hub of embodiments would thus print, collate, and staple the output and hold it in a secure output tray. The user can then locate the hub, which, in embodiments, can seek a user ID code by, for example, pinging a user's PDA for his/her business card. The hub in embodiments could then greet the user by name and asks for a prearranged password to confirm user identity. In embodiments, the password can be provided by speaking it, typing it on a text entry device, or sending it from a PDA, cell phone, or the like. Once user identity is confirmed, the hub unlocks the secure output tray and directs the user to open the tray to retrieve the print job.

In embodiments, the hub can display advertisements on display devices during periods of non-use. If a user sees something of interest, the user can ask the hub to pull up more information. The hub can transmit the data to a PDA, to a hard copy, or perhaps both. The hub in embodiments can further provide telephone and fax transmission services, enabling users to make telephone calls and send faxes, preferably on a fee-for-service basis for public access embodiments. Embodiments including video cameras can further offer videoconferencing services.

Embodiments include user detectors, such as proximity sensors, pressure sensors, and input device monitors. Proximity sensors can be IR based sensors or the like as are known in the art. Pressure sensors can be embedded in flooring surrounding the hub. In embodiments, a base is provided for the hub, the base including flooring under or in which pressure sensors can be installed. Thus, the hub can sense the approach or arrival of a user as well as departure of a user and can react accordingly.

Embodiments applied to use in a conference room setting or the like can act as networking hubs for portable electronic devices, such as PDAs, lap top computers, computer tablets, and the like. Networking can be accomplished using wired networking, wireless networking, or a combination of wired and wireless networking. Protocols for networking can include, for example, AppleTalk® and TCP/IP. For wireless networking and connectivity, embodiments can employ IRDA, IEEE 802.11, BlueTooth, and the like. Additionally, the hub can include collaboration software to facilitate sharing and simultaneous manipulation of data.

Embodiments can allow simultaneous retrieval of data while not disturbing the meeting in progress. A user can use another display of the hub, the "private side," to access the data, via, for example, the Internet and a secure data archive. The user can retrieve the data and copy it into the collaborative workspace, to her computer or other device, or both. If participants want hard copies of a work product, the hub can print the copies immediately and in the room. This obviates the need to send the information to a local printer elsewhere in the building and having to leave the room to retrieve it. The hub preferably runs scheduled self-diagnostics. When low supplies are detected, it can alert an administrator, and/or prepare an order for more supplies, and/or submit the order, depending on user preferences.

DETAILED DESCRIPTION

Figure 1:
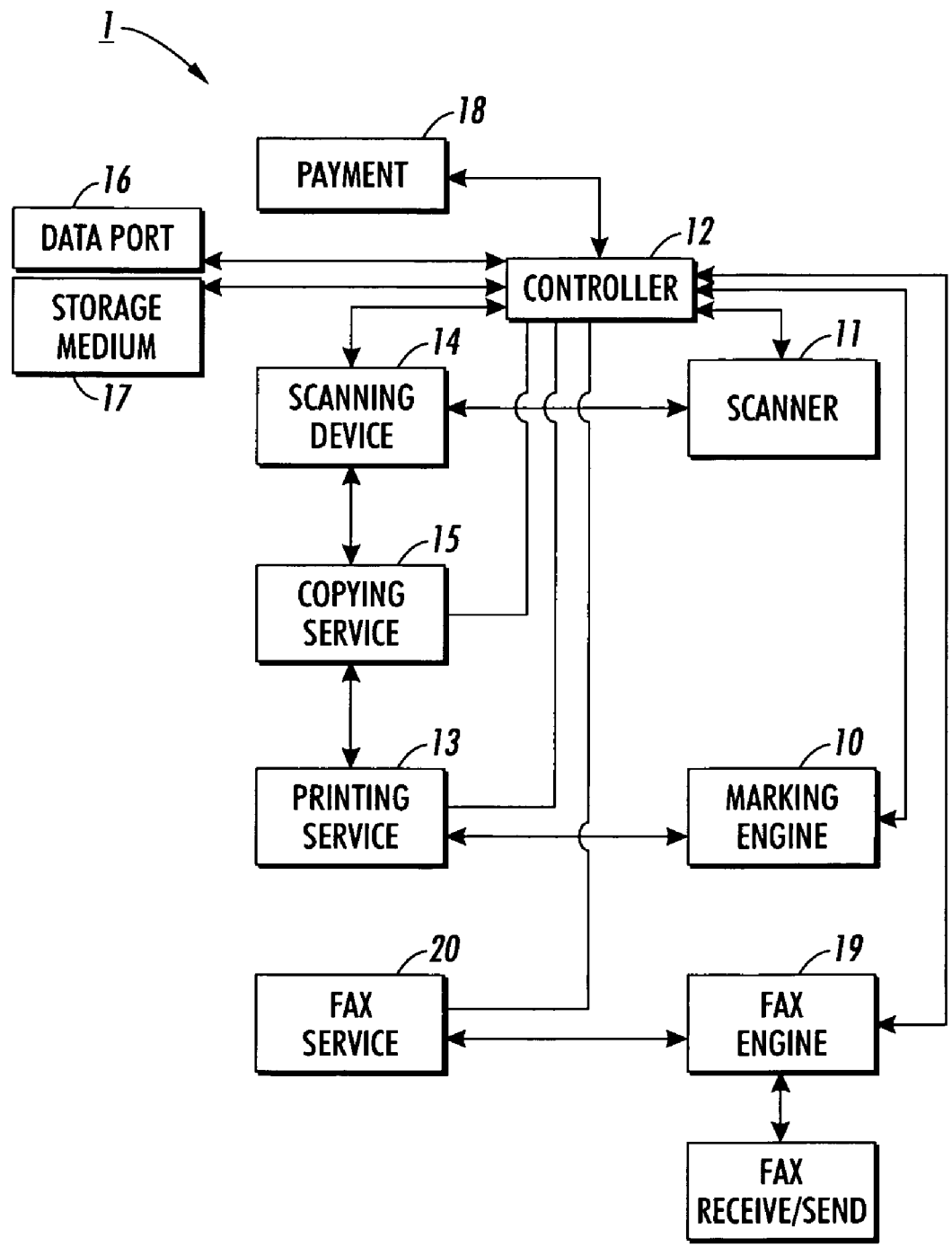
FIG. 1 is a schematic representation of the modules of embodiments.
Figure 2:
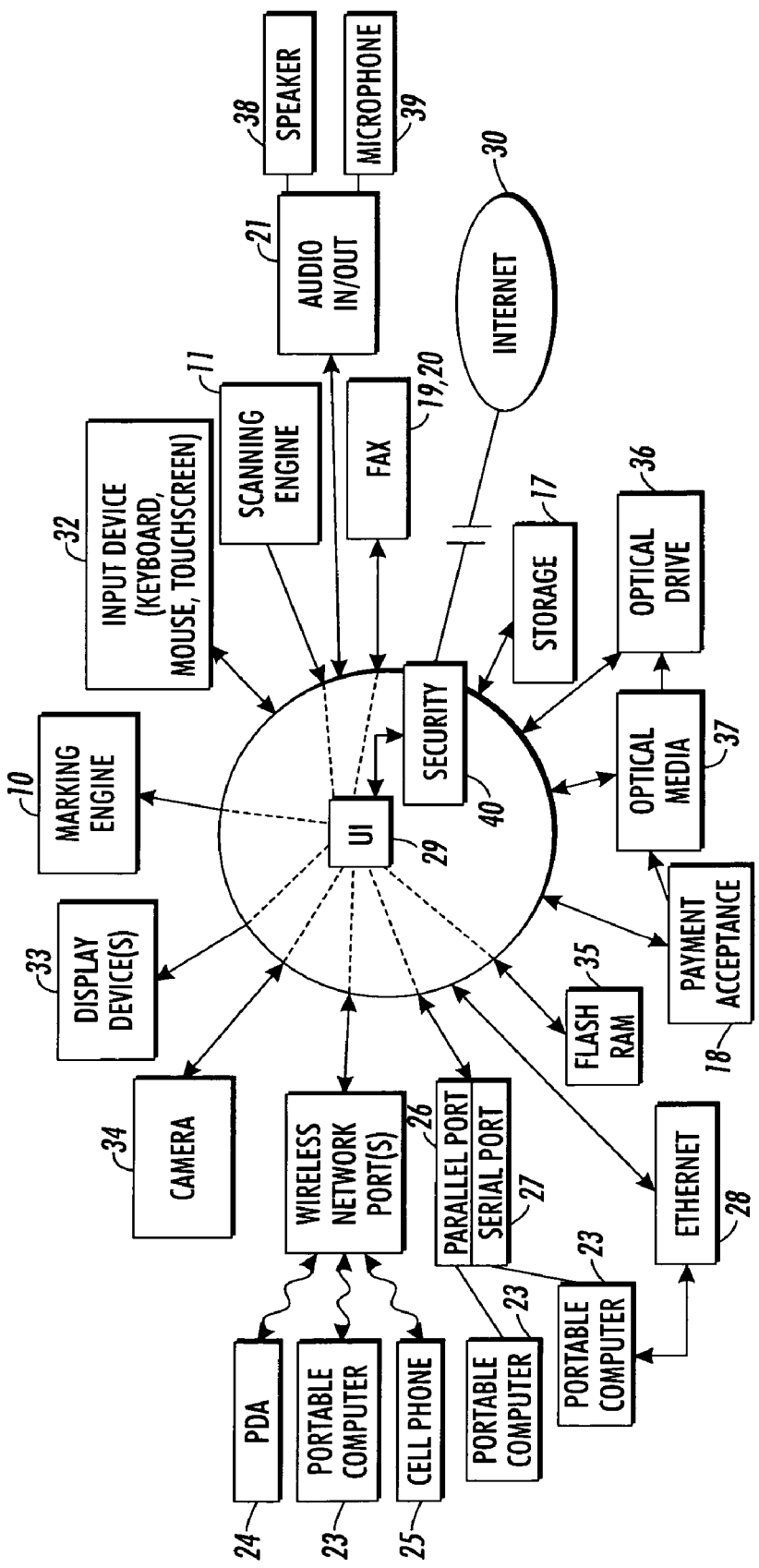
FIG. 2 is a schematic representation of the functions of embodiments.
Figure 3:
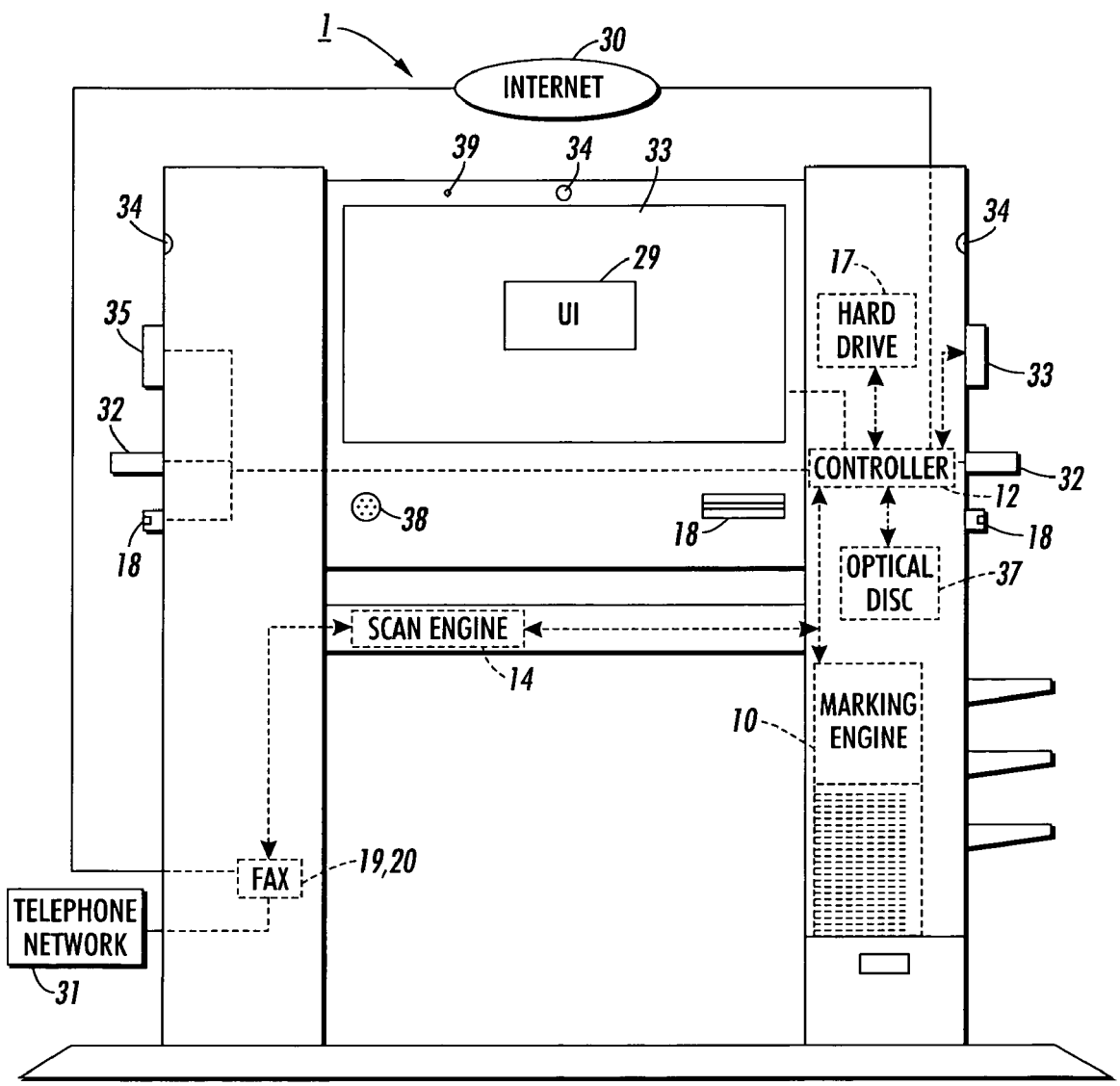
FIG. 3 is a schematic of an apparatus according to embodiments.
Figure 4:
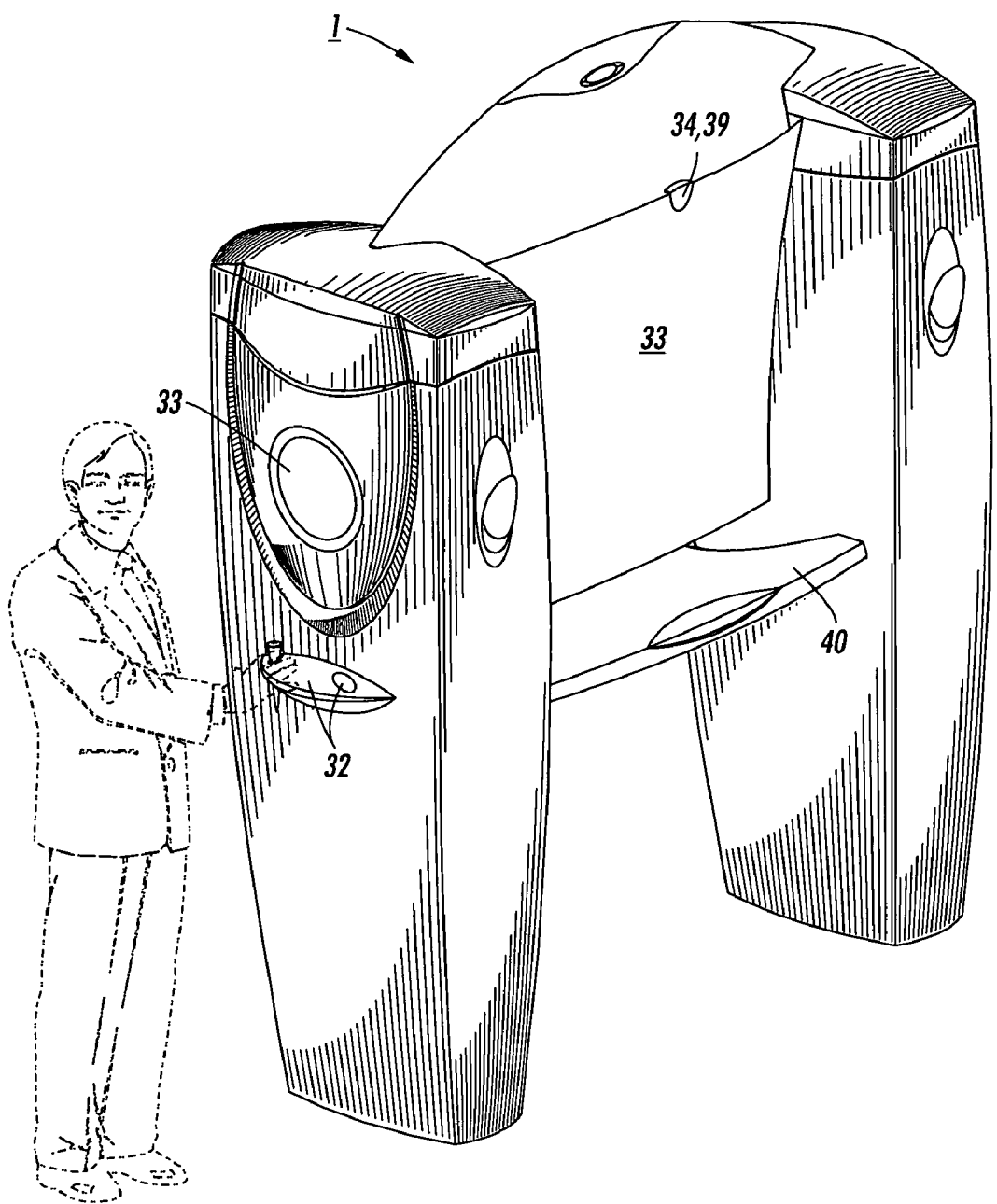
FIG. 4 is another schematic of an apparatus according to embodiments.
Figure 5:
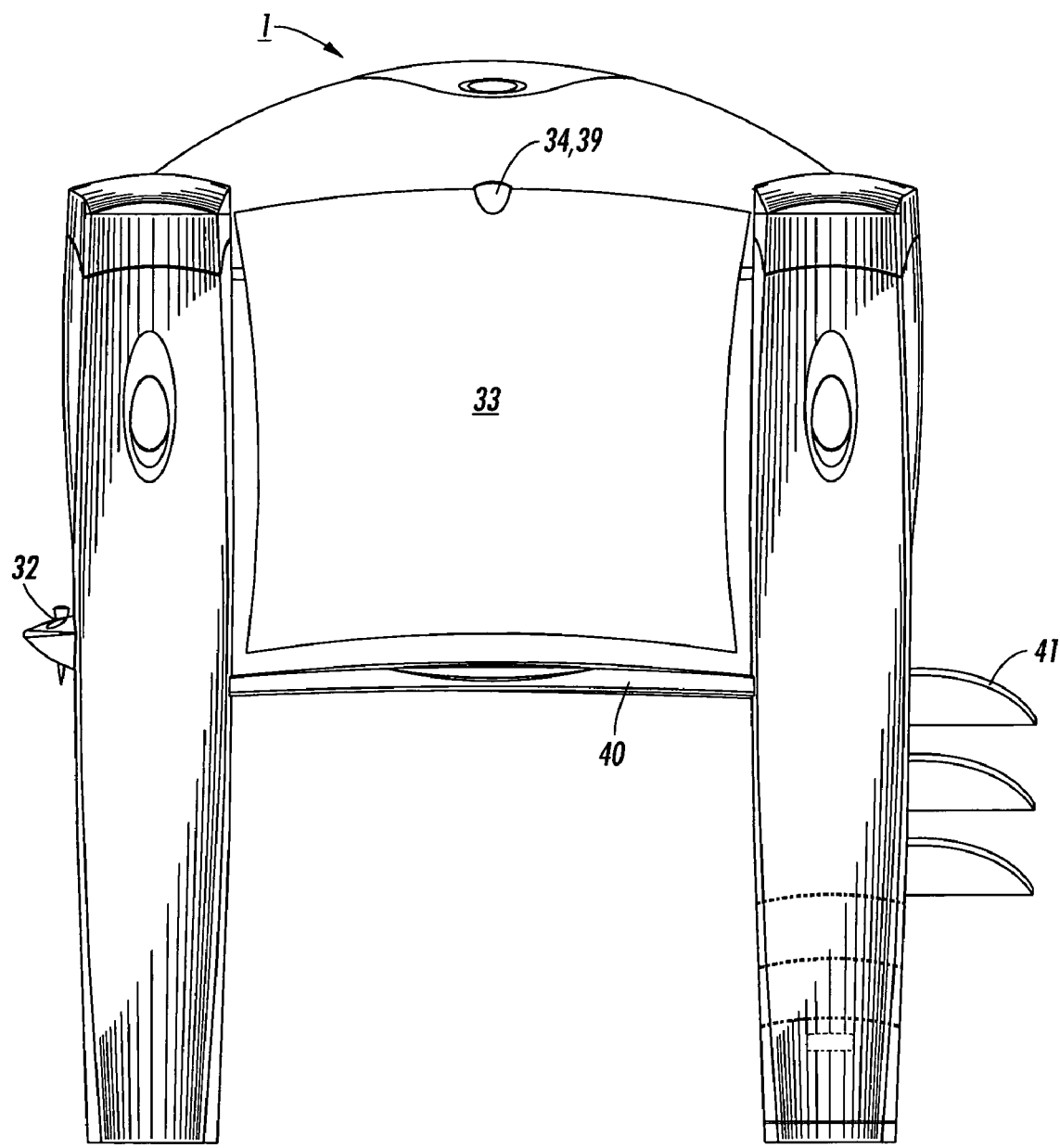
FIG. 5 is another schematic of an apparatus according to embodiments.
Figure 6:
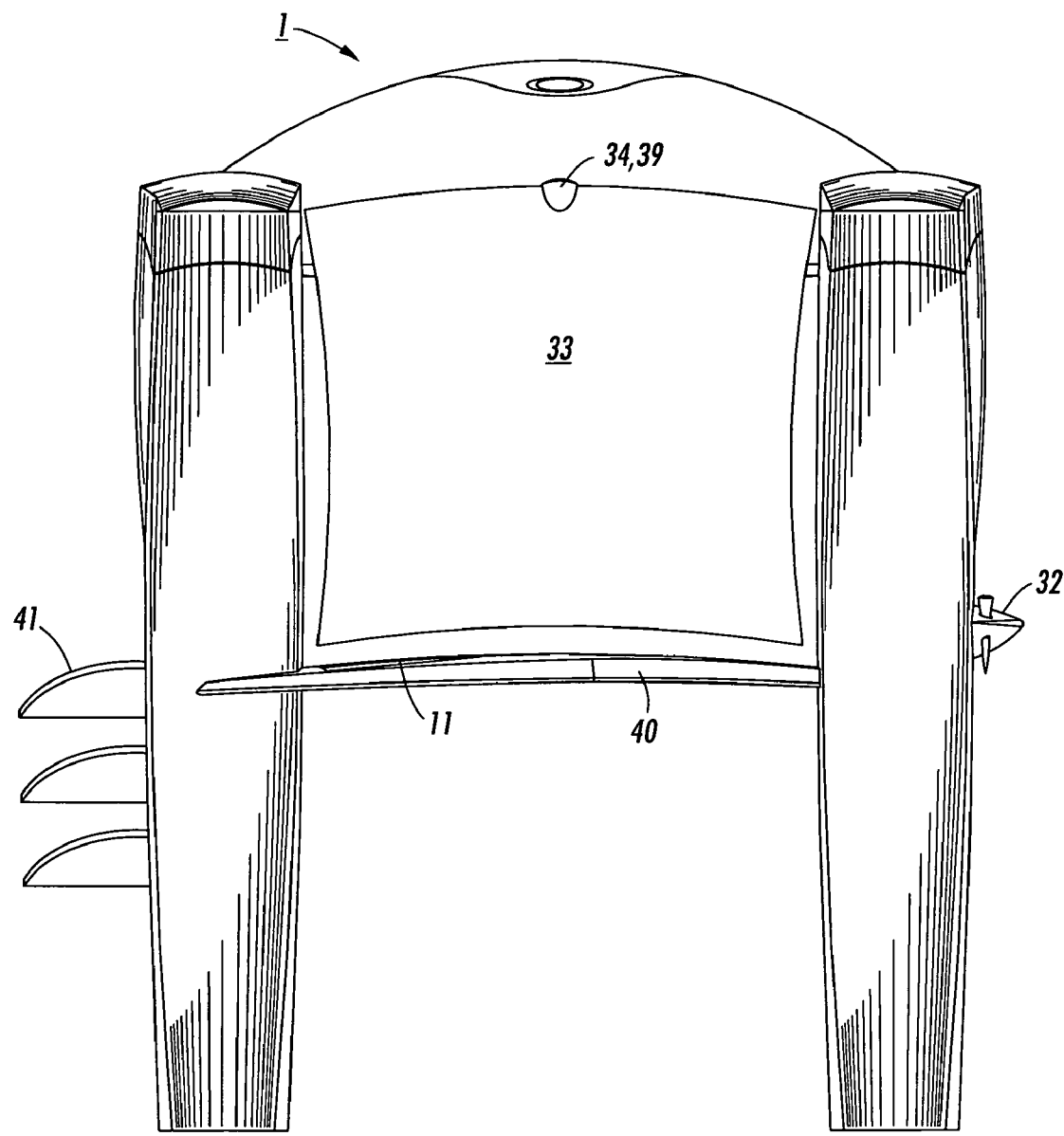
FIG. 6 is another schematic of an apparatus according to embodiments.
Figure 7:
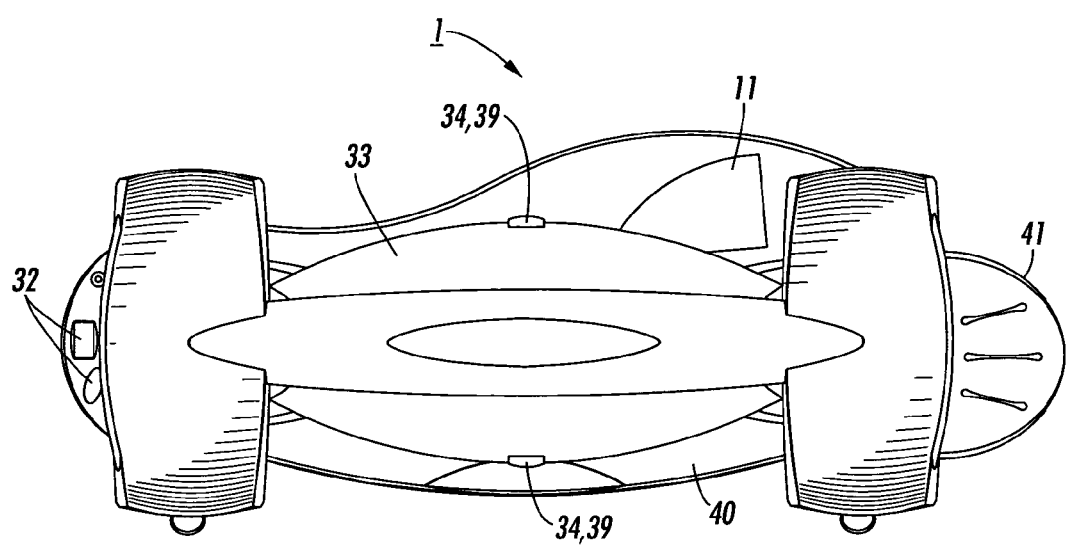
FIG. 7 is another schematic of an apparatus according to embodiments.

Preferably, embodiments comprise a communications and/or collaboration hub 1 that can offer services including, for example, telephone service, document or data creation, CD/DVD burning of data, video, and audio. Further, embodiments can provide directions, offer video games, sell software by downloading and storing on media or transferring directly to the user's computer. For embodiments in public spaces, displays not in use could display advertising, which could be a source of revenue. For example, ads could promote upcoming movies, products, services, and companies as do conventional billboards and other advertising media. Additionally, the ads could include video, audio, static images, and computer animations as desired by advertisers.

Embodiments are preferably controlled by a number of input devices 32, such as touch sensitive devices, mice, keyboards, tracked laser spots or tracked objects, and tags, that provide input to a user interface (UI) 29 of the device. Examples of touch sensitive devices include touch screens and trackpads. Examples of UIs that can be employed, with modifications, in embodiments are seen in U.S. Pat. Nos. 4,779,105, 5,119,079, 5,657,461, 5,978,559, 5,987,535, and 6,470,155, which are incorporated by reference.

Preferably, embodiments include security or authentication systems 38, such as use of personal codes or passwords that can be transmitted from a user's personal electronic device or entered via an input device. Embodiments preferably sense an approaching user, as with motion sensors or pressure sensors embedded in surrounding floor material, and send inquiries via wireless communications protocols to determine whether the user is carrying an electronic device that can provide identification and/or password, as by virtual business card or the like. Additionally, embodiments can employ voice authentication, allowing a user to speak his/her name and/or a password.

To enable remote printing for users, embodiments provide lockable printing in various forms. For example, jobs for which a user is likely to wait can be held on a storage medium or in memory until the user arrives and provides a code. For jobs for which a user is less likely to wait, secure output areas can be provided that remain locked closed until the user arrives, at which point the UI of the hub directs the user to the appropriate output area on confirmation of ID and/or password. Examples of secure printing arrangements usable in embodiments include U.S. Pat. Nos. 5,815,764, 6,213,652, and 6,606,163, which are incorporated by reference. Additionally, an example of a locking output tray can be seen in U.S. Pat. No. 5,308,058, which is also incorporated by reference.

Embodiments further contemplate automated supplies and service monitoring and upkeep using, for example, Xerox® Device Centric Services™ (DCS). DCS provides provisioning, diagnostic, and other services that can be stored locally or acquired from a remote services host. If a service is not on a particular installation, DCS can acquire the service at a user's direction.

Embodiments contemplate a public access multifunction device, such as a kiosk, that can be used, preferably on a fee-for-service basis, for on-demand internet access, file printing and sharing, scanning, and telecommunications. According to embodiments, the device includes a marking engine 10, a scanning engine 11, and a controller 12 that work together to provide a printing service module 13, a scanning service module 14, and a copying service module 15. Embodiments preferably include a storage medium 17 responsive to the controller 12 and on which the device 1 can store print and scanning data, as well as other files required for its operation. Advantageously, embodiments include a payment acceptance module 18 to facilitate fee-for-service transactions. Credit card readers, ATM card readers, cash acceptors, and software enabling transactions with banks or money transfer services via a network connection are examples of payment acceptance modules that can be used in embodiments.

The printing service module 13 of embodiments is preferably in communication with the marking engine 10 and the controller 12. In response to instructions from the controller 12, the printing service module 13 can receive print data from the controller 12 and employ the marking engine 10 to produce hard copy of the print data.

The scanning service 14 module of embodiments is preferably in communication with the scanning engine 11 and the controller 12. In response to instructions from the controller 12, the scanning service module 14 can receive scanned data from the scanning engine 11 and transmit it to the controller 12. The scanned data can then be stored with a storage device 17, 35, 36, 37 in communication with the multifunction device 1, transferred to a portable electronic device 23, 24, 25 in communication with the multifunction device, or transmitted to a specified destination via e-mail, internet file transfer, fax transmission, or another suitable transfer protocol.

The copying service module 15 of embodiments is preferably in communication with the scanning engine 11, the marking engine 10, and the controller 12. The copying service module 15 can accept scanned data from the scanning engine 11 and reproduce the scanned data with the marking engine 10 to produce a hard copy of the scanned data.

Embodiments can employ an audio feedback device 38, such as a speaker or a headset jack into which a user can plug a headset. Audio feedback can then be provided to the user in the form of simple sounds, sampled sounds, and/or speech. In addition, the audio feedback device 38 can be used in telecommunications applications as appropriate in embodiments.

Preferably, embodiments further include at least one data port 16 responsive to the controller through which the multifunction device can accept and transmit data. Embodiments include at least one networking port, such as a wireless networking port 22 or a wired networking port 28, through which the multifunction device can communicate with another device, such as a portable computer 23, personal digital assistant 24, or a cellular telephone 25. The wireless networking port 22 can employ one or more wireless networking protocols, such as IRDA, BlueTooth™, IEEE 802.11 protocols, or other wireless protocols as may be known in the art or as may arise. Preferably, the device can allow users to establish a wireless network with the device 1 and/or with each other, facilitating collaboration and sharing of data locally to the device and remotely with other networked devices. In addition, embodiments contemplate allowing connection via serial, parallel, USB, FireWire, Ethernet, and other appropriate interfaces to allow the device to act as a printer, scanner, or other peripheral directly connected to a portable computer or the like.

For embodiments with telephone connections 31, a fax transmission engine 19 and a fax module 20 controlled by the controller 12 can be included. These would be in communication with the scanning engine 11 and the fax transmission engine 19, the fax module 20 accepting scanned data from the scanning engine 11 and transmitting the scanned data as a fax via the fax transmission engine 19. Alternatively, the fax module 20 could process an electronic file, such as a word processing document, to create fax data and send the fax data to the fax transmission engine 19 for transmission to a fax recipient. Further embodiments could employ internet 30—based faxing via an internet dial-up connection established with the telephone connection 31 or via another type of internet 30 connection, such as DSL or cable modem.

As mentioned above, the device 1 includes at least one data port 16. Preferably, the device includes at least one audio input port and an audio data handler module controlled by the controller and comprising a plurality of UI elements representing different audio functions. At least one of the plurality of UI elements can represent telephone communication, and the device can further comprise a telephone module in communication with the audio data handler module. The audio data handler module would then accept audio input from the at least one audio input port and send it to the telephone module, and the telephone module would send the audio over a telephone connection. Thus, the device can be used to make telephone calls. Such calls can be made using conventional telephone communications, according to embodiments. Additionally, calls can be made using voice-over-IP communications, in which case the device includes a voice-over-IP module in communication with the audio data handler module. The voice-over-IP module accepts audio input from the at least one audio input port, sending it to the voice-over-IP module, which sends the audio over an IP connection. Preferably, at least one of the plurality of UI elements represents voice-over-IP communication.

In embodiments, at least one UI element represents audio file creation. When activated, an audio file creation module in communication with the audio data handler module accepts audio input from the at least one audio input port and sends it to the audio file creation module. The audio file creation module then encodes the audio data and stores it in a file using, for example, μLAW, WAV, AAC, MPEG-2 layer 3 (MP3), CD audio, or other encoding schemes and file formats as are known or arise in the art.

An additional function that can be employed in embodiments is voice authentication. At least one UI element represents voice authentication, and the device further comprises a voice authentication module. The voice authentication module is responsive to the controller and in communication with the audio data handler to accept voice input for authentication. Various authentication routines as are known in the art and as may arise can be used by the module.

Voice command and control can be employed in embodiments, allowing users to control operation of the device, its modules, and even navigate the Internet in embodiments that include Internet connectivity. Further, embodiments can include speech-to-text software that will allow users to dictate text documents with the device. Examples of suitable command, control, and speech-to-text packages include, but are not limited to, IBM® ViaVoice®, MacSpeech™ iListen™ and ListenDo™, and Dragon® Naturally Speaking™. These and other options are available, for example, through Scan-Soft® and MacSpeech®.

Embodiments also preferably provide users the ability to use video data for teleconferencing and other applications. Thus, at least one data port of embodiments includes one or more video input ports and a video module controlled by the controller. Additionally, embodiments include a camera connected to a video input port and sending video data to the video handling module. The video handling module can then create an image file, a movie file, or send the video data to other modules for other purposes. Preferably, the UI of the device includes elements representing different video functions. Preferably, embodiments include UI elements representing image and/or video file creation activating a video file creation module in communication with the video module. The video file creation module accepts video input from the at least one video input port, including from a camera, and sends it to the video file creation module, which encodes the video data and stores it in a file. Where an image file is created, well known formats, such as TIFF, GIF, JPEG, and the like can be employed. Where a movie file is created, will known formats, such as MPEG, AVI, and QuickTime® can be employed. Once created, still images from movie files and image files can be transmitted, transferred, and printed as the user desires.

To facilitate teleconferencing, embodiments can include a videoconferencing module in communication with the video module, the audio feedback device, and the audio input port. The video module accepts video from the camera and audio input from an audio input port, as is known, and the videoconferencing module sends the video to a videoconference. In addition, the videoconferencing module receives video and audio data and sends it to the video module and the audio feedback device. The video module can then, for example, display the video data on a display device of the multifunction device. In embodiments, users can select where the video data should be displayed, including a selection of displays on the multifunction device, a portable device connected to the multifunction device, or another device of the users' choosing.

Embodiments of the device can include various storage media drives and interfaces. For example, embodiments can include an optical disc drive that can accept user optical media and read data therefrom. Additionally, the optical disc drive can be a read/write optical drive, such as a CD-R/RW or DVD-R/RW/RAM drive, with a burn mode in which the optical disc drive can burn data onto optical media. This can allow users to burn captured video, textual, and audio data. In embodiments, the device includes an optical media dispensary and at least one UI element offering a user the ability to purchase optical media onto which the user can have selected data burned. Additional storage media can include floppy diskettes, Zip® diskettes, and other magnetic, optical, or other storage media. Further, interfaces can be provided for various types of USB drives and flash RAM on the market, such as pen drives, CompactFlash®, Sony® Memory Stick®, MultiMedia Card, and others as are available and may arise.

In accordance with the fee-for-service plan of embodiments, the device can include a payment acceptance module. The module can comprise, for example, an interface with an online payment service, such as PayPal® or the like. Alternatively, the payment acceptance module can comprise a currency acceptor or a credit card reader and charge authorization module. Additional alternatives include an interactive account creation and maintenance interface in which a user can create an account including payment information. Users can also employ user authorization to use an existing account with such an account based scheme.

In embodiments, the device preferably includes at least one video display device on which the controller displays UI elements to interact with users, as well as data requested for display by users. In embodiments, one display is mounted for public viewing at substantially average adult human eye-level and displays advertisements during periods when the device, or at least the particular display, is not in use. The publicly viewable display preferably has associated keyboard and pointing devices, or can be a touch sensitive display that is also a GUI input device. Advantageously, embodiments can employ a main display that is substantially invisible when not in use, such as a water vapor based display as was recently reported by CNN and Reuters (reported in September, 2003, at <http://www.cnn.com/2003/TECH/ptech/09/15/video-screen.air.reut/index.html>, though this link now appears to be dead).

Particularly in embodiments used in conference rooms, the hub can include collaboration software, such as that based on, for example, one or more of the ITU-T H.323, H.225, H.235, H.245, Q.931, and H.450.1 standards, the standards on which Microsoft® NetMeeting® and other voice-over-IP and collaboration software applications are based. Other standards and software applications could be used, so long as such applications allow appropriate communication and collaboration. Thus, when a user wishes to collaborate, he or she can employ the on-board software and input/output devices of the hub, and/or the user can connect and collaborate with his/her personal electronic device(s), such as PDAs or laptop computers.

A preferred configuration of embodiments comprises a chassis of at least one tower that houses the marking engine, scanning engine, faxing engine, the microprocessor controller, storage devices, display devices, and data ports. Preferably, the hub of embodiments comprises two towers between which extends a display device, such as a plasma or LCD display, and a work surface. The display device can have a camera and microphone mounted thereon, and the work surface can have the scanning engine embedded therein. Additionally, embodiments include mounting a second display on the back of the display extending between the towers, and additional embodiments preferably include one or more additional displays mounted on surfaces of the towers so that more than one user can access the hub at once. All of the displays preferably have input devices associated therewith, such as keyboards and pointing devices. Alternatively, one or more of the displays can be touch sensitive displays that can serve as pointing devices and keyboards in conjunction with appropriate UI elements.

As discussed above, at least one data port, preferably including networking, video, and audio ports, are provided in the hub. For audio feedback, on or more speakers can be mounted on the chassis. In embodiments, a headset can be plugged into a headset jack for private audio input and/or output. With the various inputs and outputs of the hub, videoconferencing with one or more users on the hub and a remote person or persons can preferably be provided.

The microphone in embodiments can allow use of a speech recognition package with the UI of the hub. Preferably, embodiments include a command and control speech recognition package that provides control over the hub and applications running on the hub via spoken commands. Additionally, the speech recognition package preferably provides navigation of a network to which the hub is attached via spoken commands. Additionally, in embodiments allowing creation of documents, the speech recognition package preferably comprises a speech-to-text package.

Additional data ports can include a parallel interface port and/or a serial interface port. The devices that can connect to the hub preferably include portable or laptop computers, personal digital assistants (PDAs), cellular telephones, and storage devices. Preferably, the chassis includes an interface to accommodate one or more types of flash memory, and at least one USB port. In preferred embodiments, as discussed above, the hub can include an optical media drive that preferably can read and write optical media, such as DVDs and CDs.

As thus described, embodiments contemplate a public access multimedia communications and collaboration hub that allows travelers and other users to browse the internet, check e-mail and webmail, and connect portable devices for file transfers, printing, and other functions and services on a fee-for-service basis. Additionally, embodiments include videoconferencing capabilities and fax transmission capabilities. Preferably, embodiments also allow users to employ the camera and microphone(s) of the hub to capture movies and/or still images that can be stored and/or transmitted.

Preferably, embodiments offer services including, for example, telephone service, document or data creation, CD/DVD burning of data, video, and audio. Further, embodiments can provide directions, offer video games, sell software by downloading and storing on media or transferring directly to the user's computer. For embodiments in public spaces, displays not in use could display advertising, which could be a source of revenue. For example, ads could promote upcoming movies, products, services, and companies as do conventional billboards and other advertising media. Additionally, the ads could include video, audio, static images, and computer animations as desired by advertisers.

Embodiments are preferably controlled by a number of input devices, such as touch sensitive devices, mice, keyboards, tracked laser spots or tracked objects, and tags. Examples of touch sensitive devices include touch screens and trackpads. Preferably, embodiments include authentication systems, such as use of personal codes or passwords that can be transmitted from a user's personal electronic device or entered via an input device. Embodiments preferably sense an approaching user, as with motion sensors or pressure sensors embedded in surrounding floor material, and send inquiries via wireless communications protocols to determine whether the user is carrying an electronic device that can provide identification and/or password, as by virtual business card or the like. Additionally, embodiments can employ voice authentication, allowing a user to speak his/her name and/or a password.

To enable remote printing for users, embodiments provide lockable printing in various forms. For example, jobs for which a user is likely to wait can be held on a storage medium or in memory until the user arrives and provides a code. For jobs for which a user is less likely to wait, secure output areas can be provided that remain locked closed until the user arrives, at which point the UI of the hub directs the user to the appropriate output area on confirmation of ID and/or password.

Embodiments further contemplate automated supplies and service monitoring and upkeep using, for example, Xerox® Device Centric Services™ (DCS) DCS provides provisioning, diagnostic, and other services that can be stored locally or acquired from a remote services host. If a service is not on a particular installation, DCS can acquire the service at a user's direction. Examples of such services systems are seen in U.S. Provisional Patent Application 60/319,622, filed 16 Oct. 2002, and U.S. Provisional Patent Applications Nos. 60/319,623, 60/319,624, 60/319,625, filed 17 Oct. 2002, all of which are incorporated by reference. Additionally, U.S. patent applications Ser. Nos. 10/687,244 by Naveen Sharma, et al., Ser. No. 10/686,844 by Naveen Sharma, et al., Ser. No. 10/687,142 by Michael R. Furst, et al., Ser. No. 10/686,824 by Michael R. Furst, et al., Ser. No. 10/686,842 by Ronald M. Rockwell, and Ser. No. 10/686,843 by Ronald M. Rockwell, all filed on 16 Oct. 2003, are also incorporated by reference.

As an example of a scenario in which embodiments can be employed, consider John, traveling on business, who has arrived at Chicago's O'Hare airport. The next morning, he has an important meeting with a new client, and he did not want to carry the 20 full color presentation packages with him, due to weight and space constraints. Instead, John had sent a command through, for example, the Xerox service network from his wireless PDA to order printing, collation, and stapling of the presentation materials from a public access hub according to embodiments. About 30 minutes before John landed, the hub had printed, collated, and stapled these materials and held them in a secure output tray.

John proceeds to a common area of the airport and easily locates the hub according to embodiments. His documents are awaiting his arrival in the secure tray, face down and locked up. The hub seeks a user ID code, pinging John's PDA for his business card, then greets John by name and asks him to provide a prearranged password to confirm his identity. John has the option of speaking it, typing the password on the keyboard, or sending it from his PDA. Once his identity is confirmed, and the hub unlocks the secure output tray and directs John to open the tray to retrieve his print job. As he is doing this, he notices an advertisement for a Chicago restaurant being shown in the screen within a screen portion of the large display. Since John has never been to Chicago before, he thought about how nice it would be to see some of the sights as time permitted.

John asks the hub to pull up a local travel guide with recommendations, and a map identifying the location of his hotel. The hub asks John if he would like the data sent to his PDA, or if he would like a hard copy, or perhaps both. John opts for both, and as the data is being sent wirelessly to his PDA, the hub prints a hard copy for him.

John remembers that he promised to call his wife when he landed, and with the words "Call Home," the hub dials the home number it found in John's business card and connects John to his wife. The built-in camera on the hub sends real time live images to his residence, where his wife talks to him on their video phone. After saying goodbye, a scrolling local weather report catches his attention, as it described a rainy storm front that is expected to stay in the area for the next several days, reminding him that he forgot to bring an umbrella. Having completed his tasks, John picks up his things and turns to depart.

The hub senses John's move away from the work area and automatically terminates the session within 20 seconds. The cost of printing, and teleconferencing is automatically be billed against his prearranged corporate account, and a digital receipt is sent to John's PDA as he walks away to catch a cab to his hotel.

Alternatively, embodiments can be applied to use in a conference room setting or the like. As an exemplary scenario, consider Bob, Jane, and Rhonda, who have arrived at a conference room at their company's corporate headquarters a few minutes ahead of schedule. There they join six other people for a teleconference with their sister department in England.

Most have a portable electronic device, such as a PDA, lap top computer, or computer tablet. Normally, sharing digital data on separate devices would pose a problem, but a hub according to embodiments is in the room. Meeting members wirelessly beam data they wish to share to the hub using a standard transfer protocol, such as TCP/IP, over wireless connections, such as IRDA, IEEE 802.11, or BlueTooth. During the teleconference, slides and other data from the participants' machines are displayed on a large display device of the hub, or on a screen or wall via a projector, allowing everyone to clearly see the presentation. A built-in camera allows the participants in England to see everyone in the room in a pop up screen, and information can be shared between the sites and edited in real time. Blocks of data can be moved around the screen by using the lap top mice, or by use of a laser pointer projected on the screen. The laser dot location is tracked by the hub, and the movements translated into specific actions.

If while the team is working a member realizes that she has forgotten to bring an important piece of data with her, embodiments can allow simultaneous retrieval of such data while not disturbing the meeting in progress. The member can instead use another display of the hub, the "private side," to access the data, via, for example, the Internet and a secure data archive. The member can then retrieve the data and copy it into the collaborative workspace, to her computer or other device, or both. If, at the end of the meeting, participants want hard copies of a work product, the hub can print the copies immediately and in the room. This obviates the need to send the information to a local printer elsewhere in the building and having to leave the room to retrieve it. The hub preferably runs scheduled self diagnostics. When low supplies are detected, it can alert an administrator, and/or prepare an order for more supplies, and/or submit the order, depending on user preferences.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A public access multifunction device comprising:
   a marking engine;
   a scanning engine;
   a controller controlling the marking and scanning, engines;
   a printing service module in communication with the marking engine and a controller, the printing service module, in response to instructions from the controller, receiving print data from the controller and employing the marking engine to produce hard copy of print data;

a scanning service module in communication with the scanning engine and the controller, the scanning service module, in response to instructions from the controller, receiving scanned data from the scanning engine and transmitting it to the controller;

a copying service module in communication with the scanning engine and the marking engine, the copying service module accepting input from the scanning engine and reproducing the scanning engine input with the marking engine to produce a hard copy of the scanning engine input;

at least one data port responsive to the controller through which the device can accept and transmit data;

a storage medium responsive to the controller on which the device can store print and scanning data, as well as other files required for its operation;

a payment acceptance; and an authorization system which senses an approaching user and sends inquiries via wireless communications protocols to determine whether the user is carrying an electronic device that can provide identification and a password to the user's account.

2. The device of claim 1 further comprising a fax transmission engine and a fax module controlled by the controller and in communication with the scanning engine and the fax transmission engine, the fax module accepting input from the scanning engine and transmitting the scanning engine input as a fax via the fax transmission engine.

3. The device of claim 1 wherein the at least one data port further comprises at least one audio input port and an audio data handler module controlled by the controller and comprising a UI with a plurality of elements representing different audio functions.

4. The device of claim 3 wherein at least one of the plurality of UI elements represents telephone communication, the device further comprising a telephone module in communication with the audio data handler module, the audio data handler module accepts audio input from the at least one audio input port and sends it to the telephone module, and the telephone module sends the audio over a telephone connection.

5. The device of claim 3 wherein at least one of the plurality of UI elements represents voice-over-IP communication, the device further comprising a voice-over-IP module in communication with the audio data handler module, which accepts audio input from the at least one audio input port and sends it to the voice-over-IP module, which sends the audio over an IP connection.

6. The device of claim 3 wherein at least one of the plurality of UI elements represents audio file creation, the device further comprising an audio file creation module in communication with the audio data handler module, which accepts audio input from the at least one audio input port and sends it to the audio file creation module, which encodes the audio data and stores it in a file.

7. The device of claim 3 wherein at least one of the plurality of UI elements represents voice authentication and the device further comprises a voice authentication module responsive to the controller and in communication with the audio data handler to accept voice input for authentication.

8. The device of claim 3 wherein at least one of the plurality of UI elements represents voice navigation and the device further comprises a voice navigation module responsive to the controller and in communication with the audio data handler to accept voice input for voice navigation.

9. The device of claim 8 wherein voice navigation traverses a UI of the device.

10. The device of claim 9 wherein voice navigation further traverses manipulation of data within modules of the device.

11. The device of claim 1 wherein the at least one data port further comprises at least one video input port and a video module controlled by the controller and comprising a UI with a plurality of elements representing different video functions.

12. The device of claim 11 wherein at least one of the plurality of UI elements represents videoconferencing, the device further comprising a videoconferencing module in communication with the video module, the video module accepts audio input from the at least one audio input port and sends it to the telephone module, and the videoconferencing module sends the video to a videoconference.

13. The device of claim 11 wherein at least one of the plurality of UI elements represents video file creation, the device further comprising a video file creation module in communication with the video module, which accepts video input from the at least one video input port and sends it to the video file creation module, which encodes the video data and stores it in a file.

14. The device of claim 1 wherein the at least one data port includes wireless data port.

15. The device of claim 14 wherein the wireless data port comprises a BlueTooth® port.

16. The device of claim 14 wherein the wireless data port comprises an IEEE 802.11 port.

17. The device of claim 14 wherein the wireless data port comprises an infrared communications port.

18. The device of claim 14 wherein the wireless data port can interact with a compatible wireless data port of another device.

19. The device of claim 18 wherein the controller forms a wireless network between the device and the another device via the wireless data port and the compatible wireless data port.

20. The device of claim 1 wherein the at least one data port comprises a serial data port and the controller communicates with another device via the serial data port and a compatible serial data port of the another device to act like a serial peripheral of the another device.

21. The device of claim 1 wherein the at least one data port comprises an Ethernet port.

22. The device of claim 21 wherein the controller forms a network with another device via the Ethernet port and a compatible Ethernet port of the another device.

23. The device of claim 1 wherein the at least one data port comprises a parallel interface data port and the controller communicates with another device via the parallel interface data port and a compatible parallel interface data port of the another device to act like a parallel interface peripheral of the another device.

24. The device of claim 1 further comprising an optical disc drive that can accept user optical media and read data therefrom.

25. The device of claim 24 wherein the optical disc drive further comprises a burn mode in which the optical disc drive can burn data onto optical media.

26. The device of claim 25 wherein the optical media is user-supplied.

27. The device of claim 25 further comprising an optical media dispensary and at least one UI element offering a user the ability to purchase optical media onto which the user can have selected data burned.

28. The device of claim 1 further comprising an Internet access module with which a user can navigate the Internet.

29. The device of claim 1 wherein the payment acceptance module comprises an interface with an online payment service.

30. The device of claim 1 wherein the payment acceptance module comprise a currency acceptor.

31. The device of claim 1 wherein the payment acceptance module comprises a credit card reader and charge authorization module.

32. The device of claim 1 wherein the payment acceptance module comprises an interactive account creation and maintenance interface in which a user can create an account including payment information.

33. The device of claim 32 wherein the payment acceptance module comprises user authorization to use an existing account.

34. The device of claim 1 further comprising at least one video display device on which the controller displays UI elements to interact with users, as well as data requested for display by users.

35. The device of claim 34 wherein the controller displays advertisements on the at least one video display device during periods when the device is not in use.

36. The device of claim 34 wherein the at least one video display device comprises a touch sensitive display that is also a GUI input device.

37. A public access multifunction device comprising:
a controller;
a marking engine and a scanning engine responsive to the controller;
printing, scanning, and copying service modules in communication with the marking and scanning engines and responsive to the controller;
the printing service module receiving print data from the controller and employing the marking engine to produce hard copy of print data;
the scanning service module receiving scanned data from the scanning engine and transmitting it to the controller;
the copying service module accepting scanned data from the scanning engine and reproducing the scanned data with the marking engine to produce a hard copy of the scanning engine input;
at least one data port responsive to the controller through which the device can accept and transmit data, the at least one data port comprising:
at least one user detector;
at least one audio input port;
at least one audio output port;
at least one video input port; and
at least one networking port;
a storage medium responsive to the controller on which the device can store print and scanning data, as well as other files required for its operation; and
an authorization system which senses an approaching user and sends inquiries via wireless communications protocols to determine whether the user is carrying an electronic device that can provide identification and a password to the user's account.

38. The device of claim 37 further comprising a fax transmission engine and a fax module controlled by the controller and in communication with the scanning engine and the fax transmission engine, the fax module accepting input from the scanning engine and transmitting the scanning engine input as a fax via the fax transmission engine.

39. The device of claim 37 further comprising an audio data handler module controlled by the controller and responsive to a UI with a plurality of elements representing different audio functions.

40. The device of claim 39 wherein the at least one data port further comprises at least one telephone service connection and at least one of the plurality of UI elements represents telephone communication, the device further comprising a telephone module in communication with the audio data handler module and the telephone service connection, the audio data handler module accepts audio input from the at least one audio input port and sends it to the telephone module, the audio data handler module accepts audio input from the telephone module and sends it to the at least one audio output port, and the telephone module sends and receives the audio over a telephone connection.

41. The device of claim 39 wherein at least one of the plurality of UI elements represents voice-over-IP communication, the device further comprising a voice-over-IP module in communication with the audio data handler module, the audio data handler module accepts audio input from the at least one audio input port and sends it to the voice-over-IP module, the audio data handler module accepts audio input from the voice-over-IP module and sends it to the at least one audio output port, and the voice-over-IP module sends and receives the audio over an IP connection.

42. The device of claim 39 wherein at least one of the plurality of UI elements represents audio file creation, the device further comprising an audio file creation module in communication with the audio data handler module, which accepts audio input from the at least one audio input port and sends it to the audio file creation module, which encodes the audio data and stores it in a file.

43. The device of claim 39 wherein at least one of the plurality of UI elements represents voice authentication and the device further comprises a voice authentication module responsive to the controller and in communication with the audio data handler to accept voice input for authentication.

44. The device of claim 39 wherein at least one of the plurality of UI elements represents voice navigation and the device further comprises a voice navigation module responsive to the controller and in communication with the audio data handler to accept voice input for voice navigation of at least a UI of the device.

45. The device of claim 37 further comprising a video module controlled by the controller and comprising a UI with a plurality of elements representing different video functions.

46. The device of claim 45 wherein at least one of the plurality of UI elements represents videoconferencing, the device further comprising a videoconferencing module in communication with the video module, the video module accepts audio input from the at least one audio input port and sends it to the telephone module, the audio data handler module accepts audio input from the telephone module and sends it to the at least one audio output port, the telephone module sends and receives the audio over a telephone connection, and the videoconferencing module sends and receives the video with a videoconference.

47. The device of claim 45 wherein at least one of the plurality of UI elements represents video file creation, the device further comprising a video file creation module in communication with the video module, which accepts video input from the at least one video input port and sends it to the video file creation module, which encodes the video data and stores it in a file.

48. The device of claim 37 wherein the at least one networking port includes at least one wireless networking port that can selectively interact with a compatible wireless networking port of another device.

49. The device of claim 48 wherein the controller forms a wireless network between the device and at least one another device via the wireless networking port and the compatible wireless networking port.

50. The device of claim 49 further comprising collaboration software allowing the at least one another device to share data and selectively simultaneously manipulate such data.

51. The device of claim 50 wherein the collaboration software is based on at least an ITU-T H.323 standard.

52. The device of claim 37 wherein the at feast one networking port comprises an Ethernet port and the controller selectively forms a network with another device via the Ethernet port and a compatible Ethernet port of the another device.

53. The device of claim 37 further comprising an optical disc drive that can accept user optical media and read data therefrom.

54. The device of claim 53 wherein the optical disc drive further comprises a burn mode in which the optical disc drive can burn data onto optical media.

55. The device of claim 54 wherein the optical media is user-supplied.

56. The device of claim 54 further comprising an optical media dispensary and at least one UI element offering a user the ability to purchase optical media onto which the user can have selected data burned.

57. The device of claim 37 further comprising a payment acceptance module.

58. The device of claim 57 wherein the payment acceptance module comprises an interface with an online payment service.

59. The device of claim 57 wherein the payment acceptance module comprise a currency acceptor.

60. The device of claim 57 wherein the payment acceptance module comprises a credit card reader and charge authorization module.

61. The device of claim 57 wherein the payment acceptance module comprises an interactive account creation and maintenance interface in which a user can create an account including payment information.

62. The device of claim 61 wherein the payment acceptance module comprises user authorization to use an existing account.

63. The device of claim 37 further comprising at least one video display device on which the controller displays UI elements to interact with users, as well as data requested for display by users.

64. The device of claim 63 wherein the controller displays advertisements on the at least one video display device during periods when the device is not in use.

65. The device of claim 63 wherein the at least one video display device comprises a touch sensitive display that is also a GUI input device.

66. A public access multifunction device comprising:
a controller;
a user interface (UI) running on the controller and comprising a plurality of UI elements with which a user can interact with the device;
at least one display device on which UI elements and data can be displayed;
at least one pointing device;
at least one text entry device; marking, scanning, and fax transmission engines responsive to the controller; printing, scanning, copying, and faxing service modules in communication with the marking, scanning, and faxing engines and responsive to the controller; the printing service module receiving print data from the controller and employing the marking engine to produce hard copy of print data;
the scanning service module receiving scanned data from the scanning engine and transmitting it to the controller
the copying service module accepting scanned data from the scanning engine and reproducing the scanned data with the marking engine to produce a hard copy of the scanning engine input;
the fax module accepting input from the scanning engine and transmitting the scanning engine input as a fax via the fax transmission engine;
at least one data port responsive to the controller through which the device can accept and transmit data, the at least one data port comprising:
at least one user detector;
at least one audio input port;
at least one audio output port;
at least one video input port;
at least one telephone service connection; and
at least one networking port;
an audio data handler module controlled by the controller and responsive to a UI with a plurality of elements representing different audio functions;
a storage medium responsive to the controller on which the device can store print and scanning data, as well as other files required for its operation; and
an authorization system which senses an approaching user and sends inquiries via wireless communications protocols to determine whether the user is carrying an electronic device that can provide identification and a password to the user's account.

67. The device of claim 66 wherein at least one of the UI elements represents telephone communication, the device further comprising a telephone module in communication with the audio data handler module and the telephone service connection, the audio data handler module accepts audio input from the at least one audio input port and sends it to the telephone module, the audio data handler module accepts audio input from the telephone module and sends it to the at least one audio output port, and the telephone module sends and receives the audio over a telephone connection.

68. The device of claim 66 wherein at least one of the UI elements represents voice-over-IP communication, the device further comprising a voice-over-IP module in communication with the audio data handler module, the audio data handler module accepts audio input from the at least one audio input port and sends it to the voice-over-IP module, the audio data handler module accepts audio input from the voice-over-IP module and sends it to the at least one audio output port, and the voice-over-IP module sends and receives the audio over an IP connection via the at least one networking port.

69. The device of claim 66 wherein at least one of the plurality of UI elements represents audio file creation, the device further comprising an audio file creation module in communication with the audio data handler module, which accepts audio input from the at least one audio input port and sends it to the audio file creation module, which encodes the audio data and stores it in a file.

70. The device of claim 66 wherein at least one of the plurality of UI elements represents voice authentication and the device further comprises a voice authentication module responsive to the controller and in communication with the audio data handler to accept voice input for authentication.

71. The device of claim 66 wherein at least one of the plurality of UI elements represents voice navigation and the device further comprises a voice navigation module responsive to the controller and in communication with the audio data handler to accept voice input for voice navigation of at least a UI of the device.

72. The device of claim 66 further comprising a camera and a video module in communication with the camera and controlled by the controller, the video module comprising a UI with a plurality of elements representing different video functions.

73. The device of claim 72 wherein at least one of the plurality of UI elements represents videoconferencing, the device further comprising a videoconferencing module in communication with the video module, the videoconferencing module accepts audio input from the at least one audio input port and sends it to the telephone module, the audio data handler module accepts audio input from the telephone module and sends it to the at least one audio output port, the telephone module sends and receives the audio over a telephone connection, and the videoconferencing module sends and receives the video with a videoconference.

74. The device of claim 72 wherein at least one of the plurality of UI elements represents video file creation, the device further comprising a video file creation module in communication with the video module, which accepts video input from the at least one video input port and sends it to the video file creation module, which encodes the video data and stores it in a file.

75. The device of claim 66 wherein the at least one networking port includes at least one wireless networking port that can selectively interact with a compatible wireless networking port of another device.

76. The device of claim 66 wherein the controller forms a network between the device and at least one another device via the at least one networking port and the compatible networking port of each device.

77. The device of claim 76 further comprising collaboration software allowing the at least one another device to share data and selectively simultaneously manipulate such data.

78. The device of claim 77 wherein the collaboration software is based on at least an ITU-T H.323 standard.

79. The device of claim 66 further comprising an optical disc drive that can accept user optical media and read data therefrom.

80. The device of claim 79 wherein the optical disc drive further comprises a burn mode in which the optical disc drive can burn data onto optical media.

81. The device of claim 80 further comprising an optical media dispensary and at least one UI element offering a user the ability to purchase optical media onto which the user can have selected data burned.

82. The device of claim 66 further comprising a payment acceptance module.

83. The device of claim 82 wherein the payment acceptance module comprises an interface with an online payment service.

84. The device of claim 82 wherein the payment acceptance module comprise a currency acceptor.

85. The device of claim 82 wherein the payment acceptance module comprises a credit card reader and charge authorization module.

86. The device of claim 82 wherein the payment acceptance module comprises an interactive account creation and maintenance interface in which a user can create an account including payment information.

87. The device of claim 86 wherein the payment acceptance module comprises user authorization to use an existing account.

88. The device of claim 66 wherein the at least one video display device comprises at least a main display and a secondary display.

89. The device of claim 66 wherein the controller displays advertisements on the at least one video display device during periods when the device is not in use.

90. The device of claim 66 wherein the at least one video display device comprises a touch sensitive display that is also a GUI input device.

* * * * *